Jan. 24, 1967  A. N. PERRY  3,300,050
FILTER UNIT
Filed Aug. 23, 1965  2 Sheets-Sheet 1
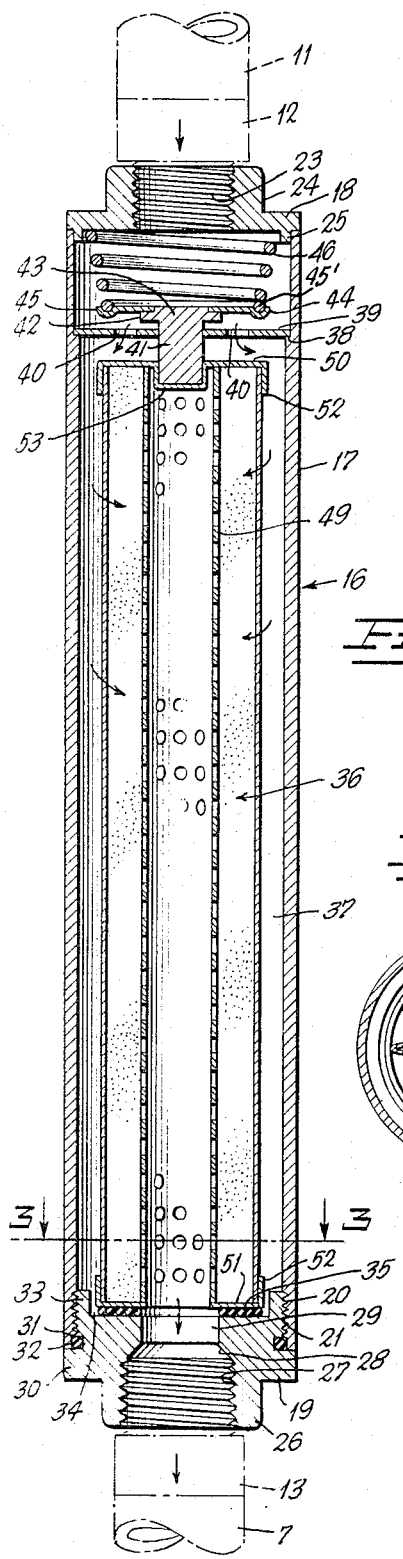
Fig. 1.
Fig. 2.
Fig. 3.
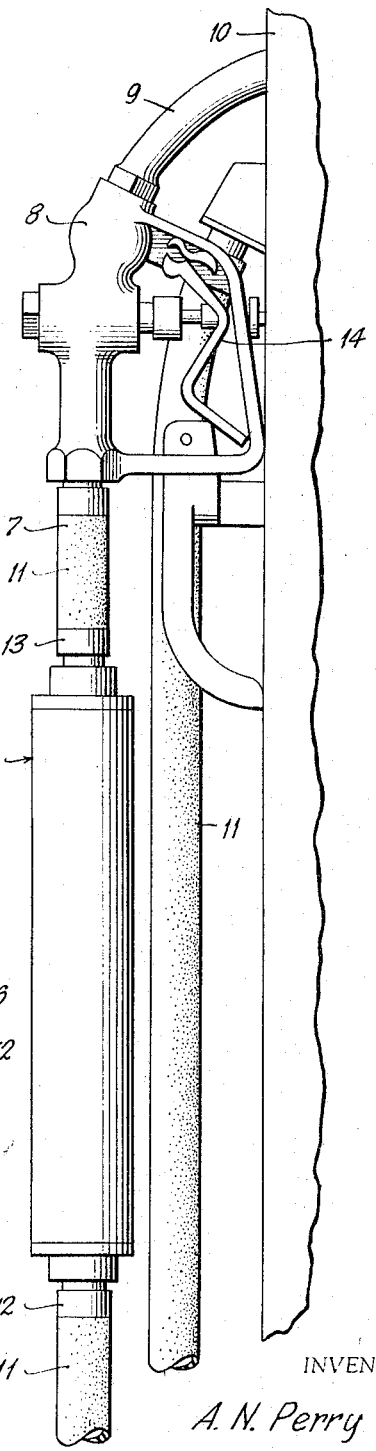
INVENTOR
A. N. Perry
BY Shoemaker and Mattare
ATTORNEYS Jan. 24, 1967  A. N. PERRY  3,300,050
FILTER UNIT
Filed Aug. 23, 1965  2 Sheets-Sheet 2
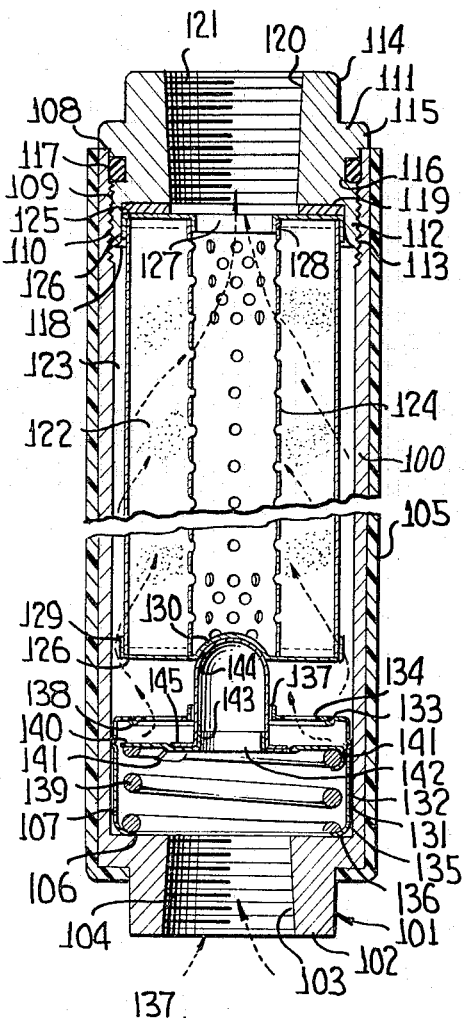
Fig. 4
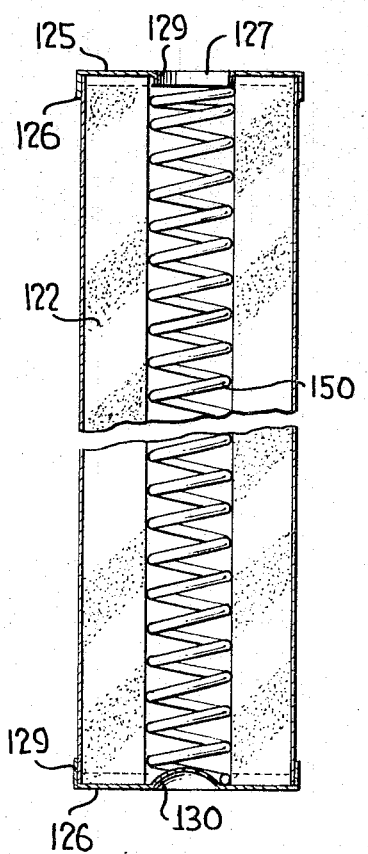
Fig. 5
Fig. 6
INVENTOR
A. N. PERRY
BY Shoemaker and Mattare
ATTORNEYS

United States Patent Office 3,300,050
Patented Jan. 24, 1967

3,300,050
FILTER UNIT
Albert N. Perry, Gastonia, N.C., assignor to Wix Corporation, Gastonia, N.C., a corporation of North Carolina
Filed Aug. 23, 1965, Ser. No. 486,257
6 Claims. (Cl. 210—234)

This application is a continuation-in-part application of my copending application Serial No. 178,065, filed March 7, 1962, and now abandoned.

The present invention relates to a filter unit that can be readily disposed in line of a hose or similar fluid conductor.

It is an object of the present invention to provide what is generally known as an in-line type filter unit that can be readily inserted in a hose line or the like through which fluid such as gasoline is flowed or pumped in order to remove any dirt, water or contaminants that may be interspersed within the gasoline so that the gasoline may be purified. As is well known, there are many bulk stations, depots and bulk storage places in which fuel such as gasoline, kerosene or jet fuel for aircraft are stored in underground vessels or in large tanks, after which the fuel is then delivered in tank trucks or other vehicles to a local point of distribution such as the gasoline service station. At the service station, the fuel is pumped from the vehicle and again stored usually in a smaller underground vessel or tank, and is thereafter dispensed to passenger cars and the like at frequent intervals. It is obvious that in the distribution of the fuel from a main storage depot to the numerous small gasoline stations and because of the time interval involved, that the fuel becomes contaminated with dirt particles, corroded particles from the metal storage vessels, condensate from the air space within the tanks, and various other sources so that the fuel actually pumped into the gasoline tank on a passenger vehicle becomes contaminated without filtration. Unless such contamination is removed, there is a good chance that the fuel line will clog or the carburetion system of the passenger vehicle will require greater maintenance due to these unwanted contaminants causing damage.

Another object of the present invention is to provide an in-line tubular filter unit provided with one way valve means therein held open by a filter media in the unit.

It is an object of the present invention to eliminate the unwanted dirt, condensate, corrosive particles, and other unwanted contaminants from the fuel as it is pumped into the gasoline tank of the passenger vehicle so as to insure the proper operation thereof, and to eliminate breakdown in operation of the vehicle and high maintenance cost such as labor and replacement of parts caused by these contaminants by providing a filter unit that filters the fuel as it is pumped from the ordinary gasoline pump in a gas station.

It is another object of the present invention to provide a filter unit having a filter media therein that can be readily discarded or thrown away and replaced with a new filter media in an inexpensive manner when it becomes clogged.

It is another object of the present invention to provide a filter media disposed in a casing or housing that can be readily inserted in the line of a rubber hose of a gas pump in a service station without requiring appurtenant equipment or a major reconstruction of present-day gasoline pumps.

It is another object of the present invention to provide a replaceable filter media in a housing that can be quickly inserted into the dispensing nozzle end of line of the rubber hose of a gas pump in an ordinary gasoline station by unskilled labor.

It is another object of the present invention to provide a filter unit having a filter media therein disposed in the line of the rubber hose of a conventional gasoline station gas pump in which the filter unit is provided with means for maintaining flow through the hose only when a filter media is disposed in the filter unit. Thus, the present invention provides a novel filter unit having a filter media or replaceable cartridge therein in which the cartridge acts to open the valve means disposed in the filter unit to permit flow therethrough.

It is another object of the present invention to provide an elongated filter unit having a replaceable filter media therein which is an in-line tubular type filter that can be readily inserted in the line of a flexible rubber hose attached to a gas pump in a gasoline station that is of a compact arrangement so that the attendant pumping the gas into a passenger vehicle is not obstructed from performing the usual task when the filter media is in the filter unit in the gas pump hose line.

It is another object of the present invention to provide a filter media having centering means therein readily adapted to engage biased valve means disposed within the filter unit so that the valve means will be properly opened to permit flow of fuel through the gas pump line only when a filter media is properly disposed therein to filter any fuel being pumped through the line.

It is another object of the present invention to provide a gasoline fuel line filter unit disposed in the line of a flexible rubber hose at the gasoline pump with means therein to prevent the flow of fuel through the pump hose unless a filter media is disposed therein to filter the fuel.

It is another object of the present invention to provide an in-line type gasoline fuel filter unit that may be readily disposed in the line of a gasoline dispensing line already in the field and in which only the replaceable filter media or the like is discarded when the filter media becomes clogged, thereby creating an inexpensive way of insuring that filtered gasoline is provided.

It is another object of the present invention to provide an in-line filter unit that can be quickly inserted in the line of the flexible rubber hose of a gasoline pump adjacent the nozzle and handle from which the gasoline is dispensed into a passenger vehicle fuel tank, and which will not interfere in any way with the flexibility of the hose when dispensing gasoline into the fuel tank of the vehicle when the pump is disposed on the side of the vehicle remote from the inlet pipe of the vehicle tank, because the filter unit, although being rigid, is of such short length with respect to the length of the hose, that the hose may be readily manipulated within the reach of the hose.

Various other objects and advantages of the present invention will be readily apparent from the following detailed description, when considered in connection with the accompanying drawing forming a part thereof and in which:

FIG. 1 shows a portion of a well-known gasoline pump or stand found in ordinary gasoline stations with the filter unit of the present invention disposed in the flexible rubber hose line through which gas is pumped to the fuel tank of a passenger vehicle;

FIG. 2 is an enlarged elevational sectional view of the filter unit of the present invention;

FIG. 3 is a transverse section of the invention taken on lines 3—3 of FIG. 2;

FIG. 4 is a modification of the valve in the filter unit;

FIG. 5 is a modification of the filter media used in the filter unit; and

FIG. 6 is an exploded perspective view of the modified valve of FIG. 4.

Referring to the drawings the reference numeral 10 generally designates a portion of a conventional gasoline pump or stand in a service station provided with a long flexible hose 11 made of rubber or the like through which fuel is pumped from an underground storage tank or vessel into a passenger vehicle that is driven alongside of the gasoline pump. The outer discharge end 7 of the rubber hose 11 is provided with a conventional handle 8 with a discharge nozzle 9 on the end thereof. The end of the nozzle 9, as is well known, is inserted within the filler tube or pipe of a fuel tank in a passenger vehicle. The handle 8 is also provided with an actuating member 14 for opening and closing a valve (not shown) within the handle for controlling the flow of fuel through the hose and nozzle 9 into the fuel tank. The particular type of nozzle and handle and valve means therein do not form part of this invention as they are well known and conventional.

The filter unit of the present invention, generally designated 16, is inserted in the line of the flexible hose 11 at a point adjacent the handle 8 as readily seen in FIG. 1. This is accomplished by cutting a small length of the hose from the flexible hose 11 and removing it, and inserting the filter unit 16 in its place. The cut ends of the hose 11 are provided with bushings 12 and 13 secured thereto so as to form a liquid-tight seal with the adjacent end or cut edge of the hose, which bushings are provided with external threads adapted to threadably engage the filter unit 16. The bushings 13 and 14 do not form part of the invention but may be of any well-known type.

The filter unit, by slight modification thereof, may be inserted between the end of the hose and the handle and nozzle structure.

The filter unit 16 comprises an elongated cylindrical metal tube 17 open at the opposite ends thereof. The inlet end of tube 17 is provided with a closure member 18 secured thereto by brazing, welding or the like, while the discharge end is provided with a closure member 19 with external threads 20 thereon that threadably engage internal threads 21 disposed on the discharge end of the cylindrical tube 17.

The closure member 18 is provided with a threaded center opening 23 formed therethrough and has a necked or reduced cylindrical portion 24 extending outwardly therefrom. The inner surface of the closure member 18 is provided with an annular rib 25 projecting into the tube 17 and having an outside diameter slightly less than the inside diameter of the end or edge of tube 17 so as to be readily inserted therein and secured thereto as set forth above.

The closure member 19 is provided with an outwardly extending central boss or bushing 26 having a central opening therethrough internally threaded as indicated at 27 with an inwardly beveled or tapered portion 28 adjacent the inner end of the threads 27, the central opening terminating in a reduced cylindrical opening or passage 29. The mid-portion of closure member 19 is provided with an outwardly extending flange 30, above which is a circumferential recess, indentation or rib 31 in which is disposed a resilient O-ring seal or gasket 32. The inwardly extending threaded portion 33 has a countersink or cylindrical recess 34 interiorly thereof and has a resilient annular gasket member 35 disposed therein.

A filter cartridge or media 36 is seated on the gasket 35 and is properly spaced with respect to the inner surface of the cylindrical tube 17 so as to provide an annular liquid flow chamber 37 around the filter cartridge. The inlet end of the cylindrical tube or casing 17 is provided with an inwardly extending shoulder 38 on its inner surface. A thin metal plate 39 having a plurality of spaced fuel inlet ports or openings 40 therein acts as a valve seat and is of such a dimension as to be readily inserted within the tube housing 17 to engage and seat upon the shoulder 38. A central opening is provided in plate 39 around which the fuel ports 40 are disposed. A cylindrical stem 41 extends through the central opening, as best seen in FIG. 2. The stem 41 is provided with an outwardly extending rim or flange 42 adjacent its outer end and terminates in a cylindrical stub portion 43 of less diameter than the rib 42.

A circular metal valve disc 44 having a central opening therein is disposed on the cylindrical stem 41 and seats against the flange 42, the central opening surrounds the cylindrical portion 43 over which it is mounted. The valve disc 44 is provided with an annular rib 45 adjacent the outer edge thereof which forms a recess 45' for mounting one of the coils of a spring member 46 therein. The upper end of the spring member 46 is mounted within the annular rib 25 on the closure member 18. The valve disc 44 and the rib 45 are of such a diameter so as to entirely cover and close the ports 40 when the spring 46 forces the disc 44 into engagement with the seat or plate 39.

The filter media 36 may comprise a well-known resin impregnated paper filter element having a plurality of convoluted or star-shaped pleats 48 (see FIG. 3) disposed around a perforated member or center tube 49. The upper and lower ends of the pleats are sealed off by end caps 50 and 51 provided with turned up rims or edges 52. The end caps are preferably of metal and are secured to the opposite edges of the pleats and the center tube by any well-known adhesive or cement. The end cap 51 adjacent the discharge end of the filter is provided with a central opening therein in alignment with the center tube, as can be seen in FIG. 2, while the end cap 50 adjacent the inlet end is a solid circular end cap and is provided with a countersink or central recess 53 therein extending into the center tube so as to completely close off the upper end of center tube 49. The countersink 53 is adapted to receive the lower end of the cylindrical member 41 therein. The filter cartridge 36 is of a length so that when the lower end of it is seated on the gasket 35, the upper end cap 50 is in spaced relationship with the fuel ports 40, and the recess 53 engages the cylindrical member 41 and moves the same upwardly against the pressure of the spring member 46 and unseating the valve disc 44 from the valve seat plate 39 so that the fuel may readily flow through the gasoline pump hose 11, the filter unit and the nozzle into the vehicle tank. This position of the filter unit and the valve is clearly illustrated in FIG. 2.

In the modified form of FIG. 4, a filter unit comprises a metal tube 100 which is the casing or housing for the filter unit. The metal tube 100 is thickened at one end 101 to provide a nut-like formation 102 having internal threads 103 for attachment to the bushing 12 of the hose 11. The threaded opening of the nut-like formation 102 is tapered inwardly as at 104 so that the threaded stud on the bushing 12 will tightly engage the threads 103 to prevent leakage of the gasoline being dispensed from the pump to the vehicle tank. The metal tube 100 may be covered throughout its entirety with a sleeve 105 of plastic or the like. The plastic sleeve or the like may be placed over the metal tube 100 to protect the finish of the vehicle should the filter unit contact any part of the body of the vehicle during the action of dispensing gasoline into the vehicle tank.

The thickened portion 101 of the end of the metal tube 100 has on its inner face a shoulder 106 which may extend from the wall 107 of the tube 100 to the central threaded portion 104.

The tube 100 is of substantially the same internal diameter and external diameter throughout its length from the thickened portion 101 to the open end 108. Adjacent the open end 108 is a threaded portion 109 having internal threads 110 thereon. The threaded portion 109 of the tube 100 is tapered inwardly from the open end 108. A closure member 111 similar to the closure member 19 of FIG. 2 is used to partially close the open end of the tube 100. The inwardly extending portion 112 of the closure member 111 has external threads 113 thereon which engage the threads 110 on the tube 100. Between the inwardly extending portion 112 and the nut-like formation 114 on the opposite end of the closure member 111 is a flange 115 which engages the end of the tube 100. Between the flange 115 and the threads 113 is a groove 116 which groove receives an O-ring or like packing member 117 engaging the inner wall of the tube 100 and seals the closure member 111 with relation to the tube 100. The inwardly extending portion 112 of the closure member 111 surrounds a countersink 118. Placed within the countersink is a ring-like gasket 119. The closure member 111 has a central opening 120 therein which is internally threaded as at 121. The central opening 120 is tapered inwardly and the threads receive the bushing 13 of the hose 11. The tapering of the opening together with the threads will insure a tight seal between the filter element and the bushing.

Received within the filter housing is a filter media 122 the external diameter of which is less than the internal diameter of the tube 100 thereby providing an annular space 123 for circulation of the fluid passing through the filter. The filter media has a central perforated tube 124. The filter media may be made of treated paper or any type of filtering media which will retain the dirt and moisture from passing through the filter unit from the gasoline storage tank and pump into the vehicle tank. The filter media has end caps 125 and 125' at the ends thereof. The end cap 125 has an inturned flange 126 around the outer portion thereof which flange surrounds the filter media adjacent the end thereof with the filter media being affixed to the end cap and flange. The end cap also has a central opening 127 which may or may not have an inturned flange 128 which engages the inner wall of the perforated tube 124. The end cap 125 engages the gasket 119 on the closure member 114 and seals that end of the filter media within the filter casing. The end cap 125' has an inwardly turned flange 129 surrounding the end of the filter media and which is adhered to the filter media along with the end cap 125'. The end cap 125' is provided with an inwardly extending dish-like central portion 130 which dish-like portion extends across the perforated tube 124 and which together with the end cap 125' entirely closes that end of the filter media.

The filter media 122 extends from the gasket 119 in the closure member 114 toward the other end of the filter unit. The closure member 114 being the outlet end of the filter unit. Mounted between the end of the filter media or end cap 125' thereof and the thickened end 102 of the casing is a cup-shaped member 131. This cup-shaped member is the valve housing for a valve unit. The cup-member comprises side walls 132 and a bottom portion 133. A ring of openings 134 is provided in the bottom 133 which become the valve ports. The open end of the cup 135 is beaded over to provide a flange 136. The bottom portion 133 also has a central opening 137 therein larger in area than one of the valve ports. Outwardly the ring of ports 134 and between the ports 134 and the side wall 132 there is formed in the bottom 133 a rib 138 which extends inwardly of the cup. Mounted within the cup is a coil spring 139 one end of which engages the flange 136. Mounted on the other end of the spring and connected therewith is a valve plate 140 which is circular in formation having equally spaced tabs 141 about its periphery which tabs are bent over and wrapped around the other end of the coil spring 139. The central portion of the valve plate 140 is offset slightly as at 141 and has a central opening 142 which opening is surrounded by a flange 143. Engaging the outer wall of the flange 143 is a domed-like configuration 144 having an outwardly extending flange 145 at the open end thereof the flange being received in the offset portion 141 and is affixed thereto by welding or any other means. The domed-portion 144 is closed in its entirety with the exception of the open end thereof and extends through the central opening 137 of the bottom 133 of the cup 131. The spring 139 bearing against the valve plate 140 normally biases the valve plate into engagement with the rib 138 in the bottom 133 of the cup and closes the port openings 134 preventing flow therethrough.

When a filter media is in the filter unit the dish portion 130 of the end cap 125' engages the domed-portion 144 of the valve member and forces the valve member against the pressure of the spring to such a point that the port openings 134 are opened to allow flow of fluid to pass through the filter unit. This insures that no fluid will pass from the pump through the nozzle unless there is a filter media within the filter unit.

FIG. 5 discloses a modified form of filter media wherein a coil spring center tube 150 is used in place of the perforated central tube shown in the other figures of the drawings. This filter media disclosed in FIG. 5 may be used with the form of the filter units disclosed in FIGS. 2 and 4.

In operation, when it is desired to insert the filter assembly of the present invention in the line of the rubber gas hose, a section of the hose 11 of approximately the same length as the overall length of the filter unit is cut out and removed from the hose 11. Thereafter, the bushings 12 and 13 are properly secured in any well-known manner to the cut edges of the hose. Thereafter, the filter assembly is threadably connected to the bushings 12 and 13 and the hose and the filter unit are ready to filter any fuel that is pumped through the gas pump. In such an operative position, the filter unit is disposed in the position shown in FIGS. 2 and 4 with the valve open so that the fuel may be pumped through the central opening in closure member and flows around the unseated valve disc and through the fuel inlet ports. Thereafter, the fuel flows into the chamber, passing in an outside-in direction through the pleats of the filter cartridge so as to deposit any contaminant, dirt and the like on the outer surface of the pleats. The clean fuel flows through the center tube of the filter media and through the central opening in closure member 19 through the handle and the nozzle 9 of the pump stand and is dispensed into the fuel tank of a passenger vehicle.

The filter unit may be inserted in the dispensing hose line of a gasoline pump between the hose and handle nozzle part so that it is not necessary in this instance to remove any portion of the hose.

When the filter becomes clogged, it is only necessary to detach the closure member 19 from the filter housing or casing 17 and remove the filter media therefrom and replace it with a fresh filter media.

When the filter media is removed from the casing 17, the closure member 19 is threaded back onto the filter housing without inserting a new filter media therein to filter the fuel, the biasing spring member will force the cylindrical member and the valve disc downwardly against the valve seat plate. In this condition, the annular rib in the valve disc overlaps the fuel ports so that the valve is closed and the flow of fuel through the assembly is prevented. Thus, the present invention provides a novel throw-away type filter media that is disposed in an in-line type tubular filter unit readily insertable and removable from a conventional service pump stand rubber hose for filtering the fuel to be pumped into passenger vehicles, and which filter media holds the valve open when a filter media is positioned within the unit and prevents flow of unfiltered fuel therethrough.

It is also apparent from the present invention that a novel type filter unit has been provided which can be readily inserted in the line of a rubber hose of a gas pump by unskilled labor and which is also inexpensive due to the fact that only the filter media is replaced and the other component parts of the unit will last indefinitely and the entire unit insures the motorist of having clean fuel available for his vehicle without contaminants and dirt in the fuel to thereby reduce the cost of maintenance and replacement of parts caused by any foreign matter originally in the fuel.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

What is claimed is:

1. A filter unit for fuel dispensing apparatus, the apparatus having a pump, a discharge conduit connected to the pump, and a flow controlling valve at the outlet of the discharge conduit, said unit comprising a housing for disposal between the discharge conduit and the flow controlling valve, the housing having end portions, a removable filter media receivable in the filter housing for filtering contaminants from the fuel flowing therethrough, the filter media having end caps thereon, one end cap having a depression therein, valve means within the housing comprising a plate adjacent one end portion and having flow openings therein, a valve closing the flow openings of the plate, the plate having another opening therein inwardly of the flow openings, the valve having a stem secured thereto, the stem extending through the other opening of the plate and being guided thereby, the stem being engaged by the depression of the end cap when the filter media is in the housing to maintain the valve open thus allowing the flow of the fuel through the housing and the flow-controlling valve.

2. A filter unit as set forth in claim 1 wherein the valve comprises a disc, the disc having an opening therein, the stem having a portion thereof surrounding the opening, the portion being secured to the valve disc, a spring within the housing engaging the valve disc and forcing the valve disc to closure position in relation to the flow openings.

3. A filter unit as set forth in claim 1 wherein the plate is secured within the housing, the valve comprises a disc having an opening therein, the stem having an outwardly extending flange adjacent one end and terminating in a stub portion beyond the flange, the stub portion extending into the disc opening with the flange engaging the disc and being secured thereto, a spring within the housing and engaging the valve disc and forcing the valve disc to closure position in relation to the flow openings.

4. A filter unit as set forth in claim 1, wherein the valve means comprises a separate assembly mounted within the housing, the assembly comprising a cup-shaped member having side walls and a bottom portion, the bottom portion having a plurality of port openings therein and a central opening, the port openings surrounding the central opening, the cup having an open end, an inwardly extending flange on the open end, a coil spring within the cup, one end engaging the inwardly extending flange, the inwardly extending flange engaging the side walls at the open end, a valve plate within the cup, means on the valve plate engaging the other end of the coil spring and mounting the valve plate on the coil spring, the valve plate having an opening therein, a flange surrounding the opening, a hollow valve stem having an open end, a flange surrounding the open end, the stem surrounding and engaging the flange surrounding the opening in the valve plate with the flange of the stem engaging the valve plate, the stem being secured to the valve plate at the points of engagement, the stem extending through the central opening of the bottom portion, the spring forcing the valve disc to closure position in relation to the flow openings.

5. A filter unit for fuel dispensing apparatus, the apparatus having a pump, a discharge conduit connected to the pump, and a flow controlling valve at the outlet of the discharge conduit, said unit comprising a tubular housing, said housing being open at both ends and being of substantially the same internal and external diameters throughout its length, closure members at each end of the housing and having central threaded openings therein, the threaded openings being for connection to bushings carried by the discharge conduit adjacent the flow controlling valve end of the conduit, the closure member at one end of the housing which is connected to the bushing on the pump side of the discharge conduit being affixed to the housing, the closure member at other end of the housing which is on the discharge side of the discharge conduit having external threads thereon engaging internal threads on the other end of the housing whereby the closure member is removably secured to the other end of the housing, a ported plate permanently disposed in the tubular housing adjacent the one end thereof and forming between the plate and the closure member a valve chamber, a valve disc within the valve chamber, a coil spring within the valve chamber one end engaging the valve disc the other end engaging the closure member, the spring forcing the valve disc against the ported plate to close the ports therein, the ported plate having a central opening therein, the valve disc having a stem affixed thereto said stem extending through the central opening of the ported plate and guided thereby, an elongated tubular filter element within the housing, the filter element comprising a perforated central tube, a pleated paper filter media surrounding the central tube, end caps at each end of the filter element, each end cap having inwardly extending flanges engaging the filter media adjacent each end thereof and being affixed to the filter media, the end cap at one end of the filter element entirely closing the one end and having a central depression therein, the central depression engaging the valve stem when the filter element is in the housing, the end cap of the filter element at other end thereof having a central opening therein in alignment with the opening through the closure member at the other end of the housing, the closure member at the other end of the housing having an enlarged recess therein, a ring gasket mounted within the recess and engaged by the end cap at the other end of the filter element, the filter element having an external diameter less than the internal diameter of the housing to provide a flow space around the filter media so that the fuel will flow inwardly through the filtering media thus removing the contaminants contained in the fuel and will flow through the central perforated tube and through the closure member at the other end of the housing and into the discharge conduit, the length of the filter element with relation to the length of the tubular housing being such that when the filter element is within the housing and the closure member at the other end of the housing is threadingly engaged with the housing with the other end of the filter element bearing against the gasket, the depression in the end cap of the filter element at the one end thereof will engage the valve stem and will force the valve disc away from the ported plate against the pressure of the spring whereupon the flow of the fuel through the housing will take place, should the filter element not be in the housing the spring will cause the valve disc to engage the ported plate thus closing the ports and prevent flow of fuel through the housing.

6. A filter unit for fuel dispensing apparatus, the apparatus having a pump, a discharge conduit connected to the pump and a flow controlling valve at the outlet of the discharge conduit, said unit comprising a tubular housing, said housing being of substantially the same internal and external diameters throughout its length, one end of the housing having an integrally formed inwardly extending end wall portion, the wall portion having an outwardly extending flange which is normal to the wall portion, the flange having a threaded opening therein, the flange being connectable to a threaded bushing mounted on the discharge conduit, the housing being open at another end thereof and having internal threads adjacent the other end, a closure member for the other end of the housing having an externally threaded portion, an enlarged flange portion and a reduced end portion, a groove formed between the threaded portion and the flange portion, a sealing means within the groove, the threaded portion having a circular recess formed internally thereof, a ring gasket seated in said recess, the closure member having a central opening extending therethrough the central opening having threads on its inner wall, the external threads of the threaded portion of the closure member engaging the internal threads of the housing with the end of the housing engaging the flanged portion and being sealed with the sealing means carried by the closure member, the internal threads engageable with a bushing mounted on the discharge conduit, the housing having a non-metallic covering thereon preventing marring of any surface with which it may come in contact, a valve unit in the housing adjacent the one end thereof, the valve unit comprising a cup-shaped member having side walls and a bottom portion, the bottom portion having a plurality of port openings therein and a central opening, the port openings surrounding the central opening, an inwardly extending rib in the bottom portion between the port openings and the side wall portion, the cup having an open end, an inwardly extending flange on the open end, a coil spring within the cup one end engaging the inwardly extending flange, the inwardly extending flange engaging the inwardly extending wall portion at the one end of the housing, a valve plate within the cup, tabs on the valve plate engaging the other end of the coil spring and mounting the valve plate on the coil spring, the valve plate having a central opening therethrough and a countersink surrounding the opening, a valve stem having an outwardly extending flange at the base thereof, the flange being seated in the countersink and affixed therein, the valve stem having a body portion of dome-like configuration extending through the central opening of the bottom of the cup and closed at its outer end, the valve stem being guided in its movement by the central opening of the bottom of the cup, the spring within the cup forcing the valve plate against the inwardly extending rib to normally close the port openings, an elongated tubular filter element within the housing, the filter element comprising a central tube, a pleated paper filter media surrounding the central tube, end caps at each end of the filter element, each end cap having inwardly extending flanges engaging the filter media adjacent each end thereof and being affixed to the filter media, the end cap at one end of the filter element entirely enclosing the one end and having a central depression thereon, the central depression engaging the valve stem when the filter element is in the housing, the end cap of the filter element at other end thereof having a central opening therein in alignment with the opening through the closure member at the other end of the housing, the end cap at the other end of the filter element engaging the gasket on the closure member when the closure member is completely engaged with the housing, the filter element having an external diameter less than the internal diameter of the housing to provide a flow space around the filter media so that the fuel will flow inwardly through the filter media thus removing the contaminants contained in the fuel and then flow through the central tube and through the closure member at the other end of the housing and into the discharge conduit, the length of the filter element with relation to the length of the tubular housing being such that when the filter element is within the housing and the closure member at the other end of the housing is threadedly engaged with the housing with the other end of the filter element bearing against the gasket, the depression in the end cap of the filter element at the one end thereof will engage the valve stem and will force the valve plate away from the bottom of the cup against the pressure of the spring whereupon the flow of fuel through the housing will take place when the flow controlling valve is opened, should the filter element not be in the housing the spring will cause the valve disc to engage the bottom of the cup thus closing the ports therein and prevent flow of fuel through the housing.

References Cited by the Examiner

UNITED STATES PATENTS

| | | | |
|---|---|---|---|
| 2,183,616 | 12/1939 | Korte | 210—452 X |
| 2,198,819 | 4/1940 | Holm | 210—448 X |
| 2,379,995 | 7/1945 | Shaw et al. | 251—337 |
| 2,413,991 | 1/1947 | Newman | 210—457 |
| 2,439,936 | 4/1948 | Kasten | 210—443 X |
| 2,642,187 | 6/1953 | Bell | 210—493 |
| 2,666,669 | 1/1954 | Wahlin | 210—457 X |
| 2,793,752 | 5/1957 | Jay | 210—234 X |
| 2,963,045 | 12/1960 | Canevari et al. | 117—94 |

FOREIGN PATENTS 629,957   4/1963   Belgium.

SAMIH N. ZAHARNA, *Primary Examiner.*

REUBEN FRIEDMAN, *Examiner.*

C. DITLOW, *Assistant Examiner.*